United States Patent
Foley et al.

(10) Patent No.: US 9,405,626 B1
(45) Date of Patent: Aug. 2, 2016

(54) AT RISK DATA CACHING (ARDC)

(71) Applicant: EMC Corporation, Hopkinton, MA (US)

(72) Inventors: Robert P. Foley, Clinton, MA (US); Daniel E. Cummins, Hudson, NH (US); Peter Puhov, Shrewsbury, MA (US); David W. Harvey, Newton, MA (US); Marc C. Cassano, Medway, MA (US)

(73) Assignee: EMC Corporation, Hopkinton, MA (US)

( * ) Notice: Subject to any disclaimer, the term of this patent is extended or adjusted under 35 U.S.C. 154(b) by 161 days.

(21) Appl. No.: 14/137,575

(22) Filed: Dec. 20, 2013

(51) Int. Cl.
*G06F 11/00* (2006.01)
*G06F 11/10* (2006.01)

(52) U.S. Cl.
CPC .................................. *G06F 11/1084* (2013.01)

(58) Field of Classification Search
CPC .................................................. G06F 11/1076
See application file for complete search history.

(56) References Cited

U.S. PATENT DOCUMENTS

| | | | | |
|---|---|---|---|---|
| 5,572,660 | A * | 11/1996 | Jones | G06F 11/1076 714/6.12 |
| 6,542,960 | B1 * | 4/2003 | Wong | G06F 11/1076 711/114 |
| 6,792,391 | B1 * | 9/2004 | Nanda | G06F 11/1076 702/185 |
| 7,549,080 | B1 * | 6/2009 | Gardner | G06F 11/1443 714/6.12 |
| 8,959,390 | B2 * | 2/2015 | Kuang | G06F 11/1076 714/6.22 |
| 2003/0131291 | A1 * | 7/2003 | Morrison et al. | 714/54 |
| 2004/0255223 | A1 * | 12/2004 | Chawla | 714/763 |
| 2007/0180296 | A1 * | 8/2007 | Byrne | G06F 11/1076 714/6.11 |
| 2008/0040416 | A1 * | 2/2008 | Forhan | G06F 11/1076 708/492 |
| 2009/0172464 | A1 * | 7/2009 | Byrne et al. | 714/5 |
| 2009/0271657 | A1 * | 10/2009 | McCombs et al. | 714/6 |
| 2010/0122115 | A1 * | 5/2010 | Olster | 714/7 |
| 2013/0067273 | A1 * | 3/2013 | Fiske | G06F 11/1076 714/6.12 |
| 2015/0095696 | A1 * | 4/2015 | Hess | G06F 11/108 714/6.24 |

* cited by examiner

*Primary Examiner* — Amine Riad
(74) *Attorney, Agent, or Firm* — Brian J. Colandreo; Mark H. Whittenberger; Holland & Knight LLP (57) ABSTRACT

A method, computer program product, and computing system for sensing the occurrence of an degraded condition within a data stripe of a RAID array. The data strip includes one or more valid data portions, one invalid data portion, and a parity portion. A request to write updated content to a target data portion within the data stripe is received, wherein the target data portion is one of the valid data portions. The valid data portions and the parity portion are read from the data stripe. The invalid data portion is reconstructed using the valid data portions and the parity portion, thus generating a reconstructed data portion. The reconstructed data portion is stored within a mirrored cache memory system. The parity portion is updated to define the updated content, thus defining an updated parity portion. The updated parity portion is written to the data stripe and the updated content is written to the target data portion within the data stripe.

17 Claims, 4 Drawing Sheets

AT RISK DATA CACHING (ARDC)

TECHNICAL FIELD

This disclosure relates to storage systems and, more particularly, to systems and methods for safeguarding data.

BACKGROUND

Storing and safeguarding electronic content is of paramount importance in modern business. Accordingly, various systems may be employed to protect such electronic content. Further, in the event of a malfunction, such systems should be able to quickly restore themselves without any data loss.

SUMMARY OF DISCLOSURE

In one implementation, a computer-implemented method includes sensing the occurrence of an degraded condition within a data stripe of a RAID array. The data strip includes one or more valid data portions, one invalid data portion, and a parity portion. A request to write updated content to a target data portion within the data stripe is received, wherein the target data portion is one of the valid data portions. The valid data portions and the parity portion are read from the data stripe. The invalid data portion is reconstructed using the valid data portions and the parity portion, thus generating a reconstructed data portion. The reconstructed data portion is stored within a mirrored cache memory system. The parity portion is updated to define the updated content, thus defining an updated parity portion. The updated parity portion is written to the data stripe and the updated content is written to the target data portion within the data stripe.

One or more of the following features may be included. In the event of a coherency error within the data stripe, the data stripe may be restored using: the updated content to be written to the target data portion; the reconstructed data portion stored within the mirrored cache memory system; and the one or more valid data portions that are not the target data portion. The mirrored cache memory system may be mirrored between a plurality of storage processors. Reconstructing the invalid data portion may include performing an XOR operation on the combination of the valid data portions and the parity portion. Updating the parity portion to define the updated content may include processing the parity portion to extract old content currently in the target data portion and add updated content to the target data portion. The degraded condition may be the result of one or more of: a drive failure and a media error. The RAID array may be one of a RAID 3 array, RAID 5 array and a RAID 6 array.

In another implementation, a computer program product resides on a computer readable medium and has a plurality of instructions stored on it. When executed by a processor, the instructions cause the processor to perform operations including sensing the occurrence of an degraded condition within a data stripe of a RAID array. The data strip includes one or more valid data portions, one invalid data portion, and a parity portion. A request to write updated content to a target data portion within the data stripe is received, wherein the target data portion is one of the valid data portions. The valid data portions and the parity portion are read from the data stripe. The invalid data portion is reconstructed using the valid data portions and the parity portion, thus generating a reconstructed data portion. The reconstructed data portion is stored within a mirrored cache memory system. The parity portion is updated to define the updated content, thus defining an updated parity portion. The updated parity portion is written to the data stripe and the updated content is written to the target data portion within the data stripe.

One or more of the following features may be included. In the event of a coherency error within the data stripe, the data stripe may be restored using: the updated content to be written to the target data portion; the reconstructed data portion stored within the mirrored cache memory system; and the one or more valid data portions that are not the target data portion. The mirrored cache memory system may be mirrored between a plurality of storage processors. Reconstructing the invalid data portion may include performing an XOR operation on the combination of the valid data portions and the parity portion. Updating the parity portion to define the updated content may include processing the parity portion to extract old content currently in the target data portion and add updated content to the target data portion. The degraded condition may be the result of one or more of: a drive failure and a media error. The RAID array may be one of a RAID 3 array, RAID 5 array and a RAID 6 array.

In another implementation, a computing system including a processor and memory is configured to perform operations including sensing the occurrence of an degraded condition within a data stripe of a RAID array. The data strip includes one or more valid data portions, one invalid data portion, and a parity portion. A request to write updated content to a target data portion within the data stripe is received, wherein the target data portion is one of the valid data portions. The valid data portions and the parity portion are read from the data stripe. The invalid data portion is reconstructed using the valid data portions and the parity portion, thus generating a reconstructed data portion. The reconstructed data portion is stored within a mirrored cache memory system. The parity portion is updated to define the updated content, thus defining an updated parity portion. The updated parity portion is written to the data stripe and the updated content is written to the target data portion within the data stripe.

One or more of the following features may be included. In the event of a coherency error within the data stripe, the data stripe may be restored using: the updated content to be written to the target data portion; the reconstructed data portion stored within the mirrored cache memory system; and the one or more valid data portions that are not the target data portion. The mirrored cache memory system may be mirrored between a plurality of storage processors. Reconstructing the invalid data portion may include performing an XOR operation on the combination of the valid data portions and the parity portion. Updating the parity portion to define the updated content may include processing the parity portion to extract old content currently in the target data portion and add updated content to the target data portion. The degraded condition may be the result of one or more of: a drive failure and a media error. The RAID array may be one of a RAID 3 array, RAID 5 array and a RAID 6 array.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
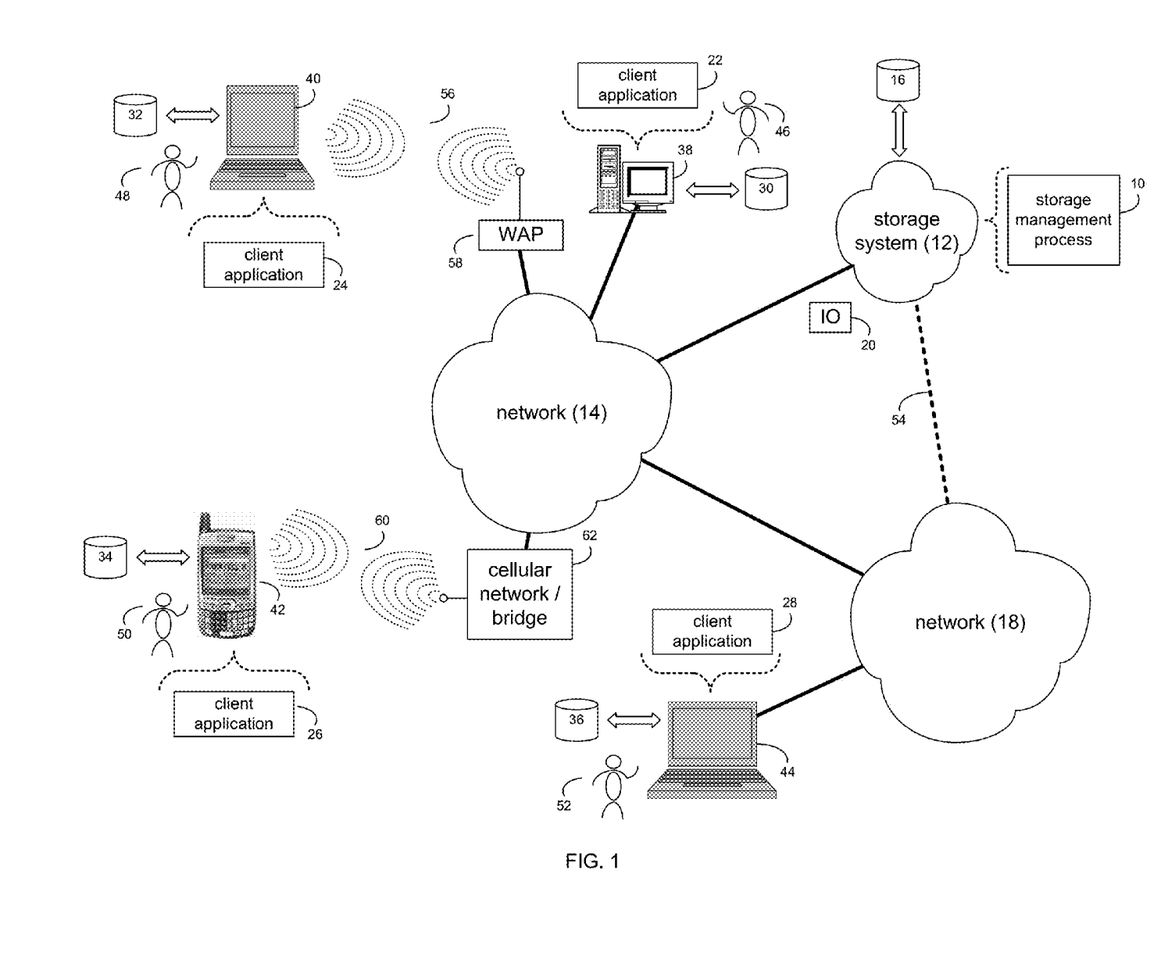
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
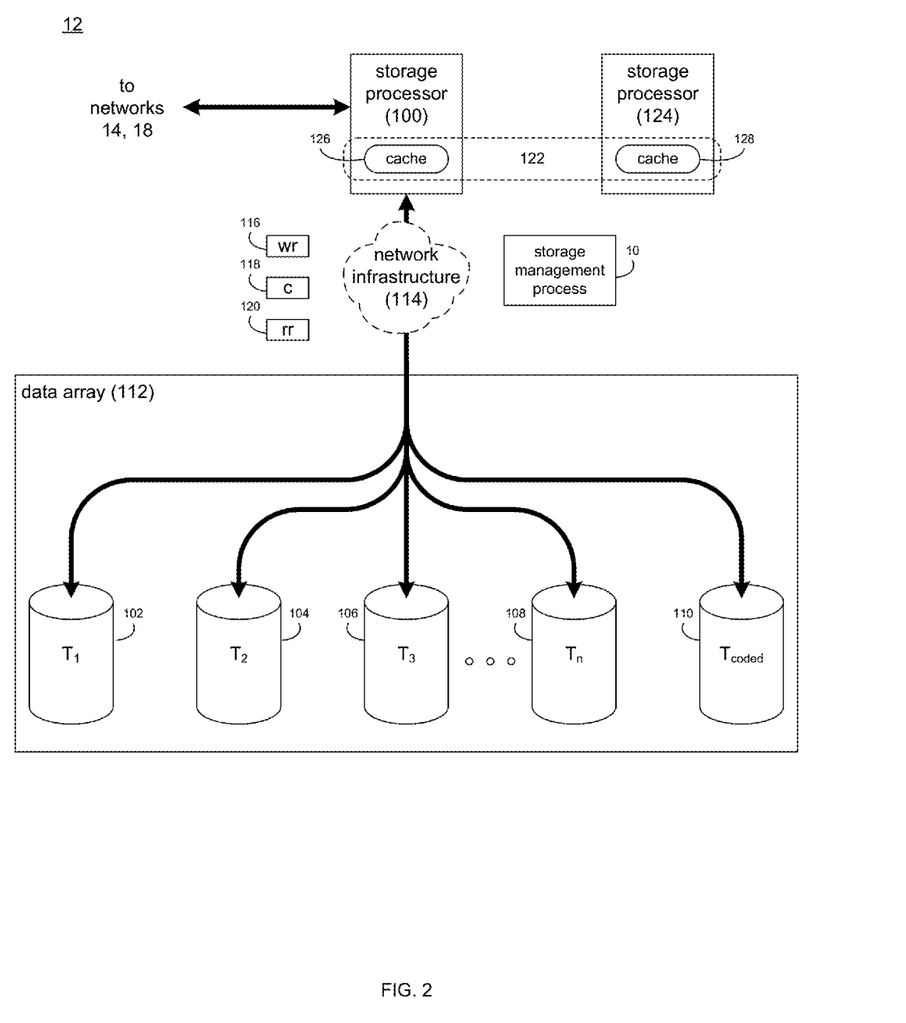
FIG. 2 is a diagrammatic view of the storage system of FIG. 1.

Referring also to FIG. 2, storage system 12 may include storage processor 100 and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/Flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Figure 3:
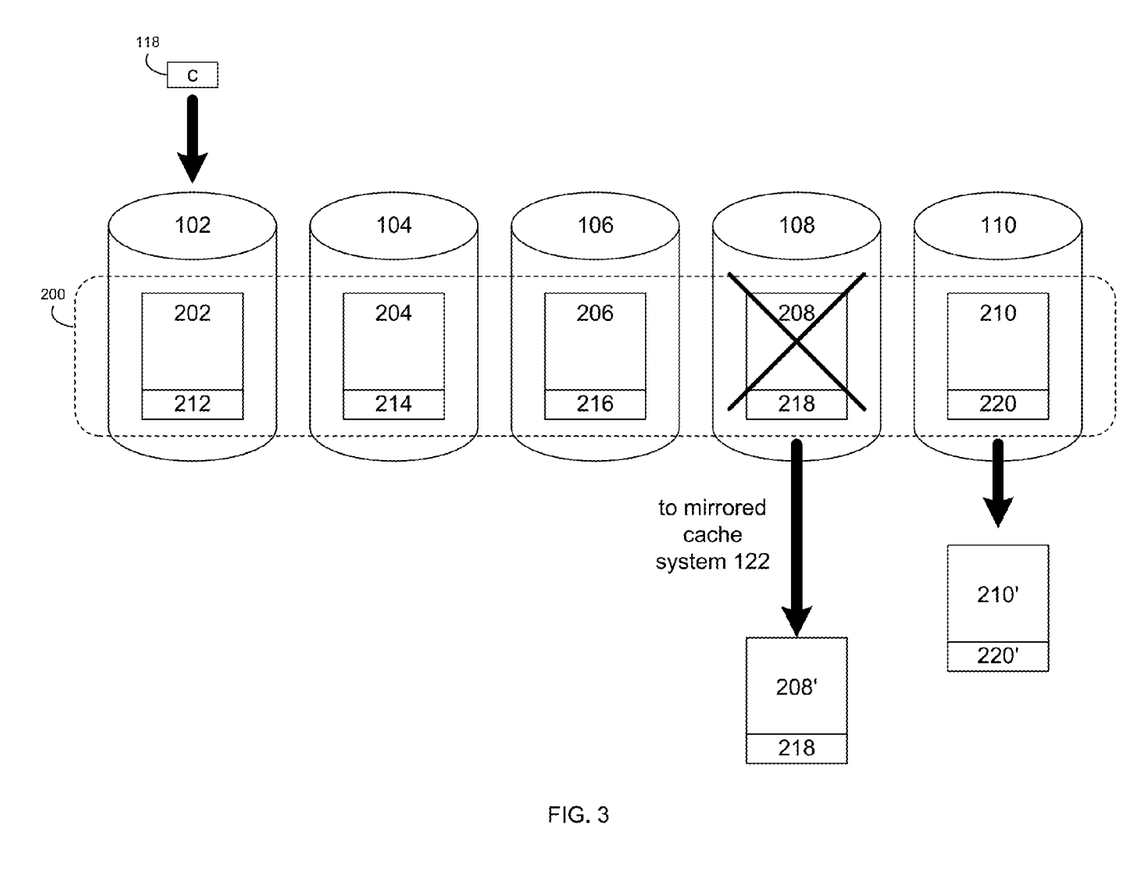
FIG. 3 is a diagrammatic view of the data array of FIG. 2.

The Storage Management Process:

Referring also to FIG. 3, when data (e.g., content 118) is stored within storage system 12 by storage management process 10, this data may be written in data stripes that span across storage targets included within data array 112. For example, data stripe 200 may be written so that (in this example) it spans the five targets, namely storage targets 102, 104, 106, 108 and coded target 110. For this particular example, assume that data array 112 is configured in a RAID 3, RAID 5 or RAID 6 format. However, storage management process 10 may be utilized with other RAID configured as well.

Further, while in this particular example, coded target 110 will be discussed as being the target that contains the parity data for data array 112, other configurations are possible and are considered to be within the scope of this disclosure. For example, such parity data may be distributed across multiple targets, wherein no one specific target exclusively functions as the coded target. For example, the parity data for a first data stripe may be stored on target 110; the parity data for a second data stripe may be stored on target 108; the parity data for a third data stripe may be stored on target 106; the parity data for a fourth data stripe may be stored on target 104; and the parity data for a fifth data stripe may be stored on target 102.

Data stripe 200 may include a plurality of portions (e.g., portions 202, 204, 206, 208, 210), wherein one portion is written to each of the storage targets. An example of such portions may include data blocks. For this example, assume that portions 202, 204, 206, 208 are data portions and portion 210 is a parity portion.

When constructing parity portion 210, storage management process 10 may perform an XOR operation on the combination of data portions 202, 204, 206, 208 (e.g., parity portion 210 may be equal to data portion 202 $\oplus$ data portion 204 $\oplus$ data portion 206 $\oplus$ data portion 208). As is known in the art, in the event that a data portion is lost/corrupted/invalid (e.g., one of data portions 202, 204, 206, 208), the parity portion may be utilized to restore the lost/corrupted/invalid data portion. For example, if data portion 202 is lost/corrupted/invalid, data portion 202 may be restored via another XOR operation (e.g., data portion 202=data portion 204 $\oplus$ data portion 206 $\oplus$ data portion 208 $\oplus$ parity portion 210).

Accordingly, as data (e.g., content 118) is written to data array 112, storage management process 10 divides this data into the above-described data portions, from which the above-described parity portion is calculated, and these data portions and parity portion are written to data array 112 as data stripes. Storage management process 10 may also calculate a checksum for each of data portions 202, 204, 206, 208 and parity portion 210. These checksums (e.g., checksums 212, 214, 216, 218, 220) may be appended to/included within data portions 202, 204, 206, 208 and parity portion 210. In the event that one or more of data portions 202, 204, 206, 208 and parity portion 210 are read/retrieved by storage management process 10, storage management process 10 may first compare these checksums (e.g., checksums 212, 214, 216, 218, 220) to their related portion (e.g., data portions 202, 204, 206, 208 and parity portion 210 respectively) to confirm that the data included within these portions is indeed valid.

Unfortunately, during operation of storage system 12, events may occur that result in one or more of the above-described data stripes being damaged. For example, if storage target 102 (e.g., a hard disk drive) is no longer operable due to a failed motor, data portion 202 may be invalid. If, when trying to read data portion 204 from storage target 104, it is determined that the checksum does not match the data portion, data portion 204 may be invalid. In the event that either of these conditions occur, data stripe 200 will be deemed by storage management process 10 and storage system 12 to be operating in a "degraded condition".

In either of these two scenarios (i.e., a failed storage target or a checksum mismatch), the invalid data portion may be recoverable via the XOR operation described above. However, problems may occur when more portions are invalid than are recoverable. In a RAID 3 configuration or a RAID 5 configuration, if two portions are invalid due to e.g., target failures and/or checksum mismatches, an "uncorrectable condition" has occurred, as the above-described XOR operation cannot recover more than one invalid portion.

Assume for illustrative purposes that upon storage management process 10 attempting to read data stripe 200, it is determined that storage target 108 has failed (resulting in data portion 208 being invalid). Accordingly, data stripe 200 is deemed to be operating in a "degraded condition".

As discussed above, a single invalid data portion may be recoverable via the XOR operation described above (which utilizes parity portion 210). Accordingly, when data stripe 200 is operating in such a "degraded condition", if the invalid data portion (e.g., data portion 208) is to be recoverable, the validity of parity portion 210 must be maintained.

Unfortunately, in the event that there is e.g., a power failure when writing data stripe 200, data stripe 200 may have a coherency problem. Continuing with the above-described example in which data portion 208 is invalid and data stripe 200 is operating in a "degraded condition", assume that data portion 202 is to be updated due to a data write request. Accordingly, parity portion 210 will need to be updated to reflect the change in the content of data portion 202 and then data portion 202 (with its updated content) and the updated version of parity portion 210 will be written to data stripe 200.

Assume that data portion 202 (with its updated content) is written to data stripe 200 and then a power failure occurs. Therefore, the updated version of parity portion 210 was not written to data stripe 200 before the power failure. Accordingly, the older version of parity portion 210 (which still resides on data stripe 200 due to e.g., the power failure) is no longer valid and cannot be used to recover lost data within data stripe 200. And since (in this example) data stripe 200 is currently operating in a "degraded condition" (i.e., due to data portion 208 being invalid), data portion 208 is no longer recoverable using parity portion 210 (due to it being an older version). Accordingly, the occurrence of this coherency error while data stripe 200 was operating in a "degraded condition" resulted in the above-described "uncorrectable condition" since (in this example) data portion 208 is invalid due to e.g., the failure of storage target 108 and parity portion 210 is invalid due to e.g., it being an older version and not reflecting the updated content included within data portion 202.

Figure 4:
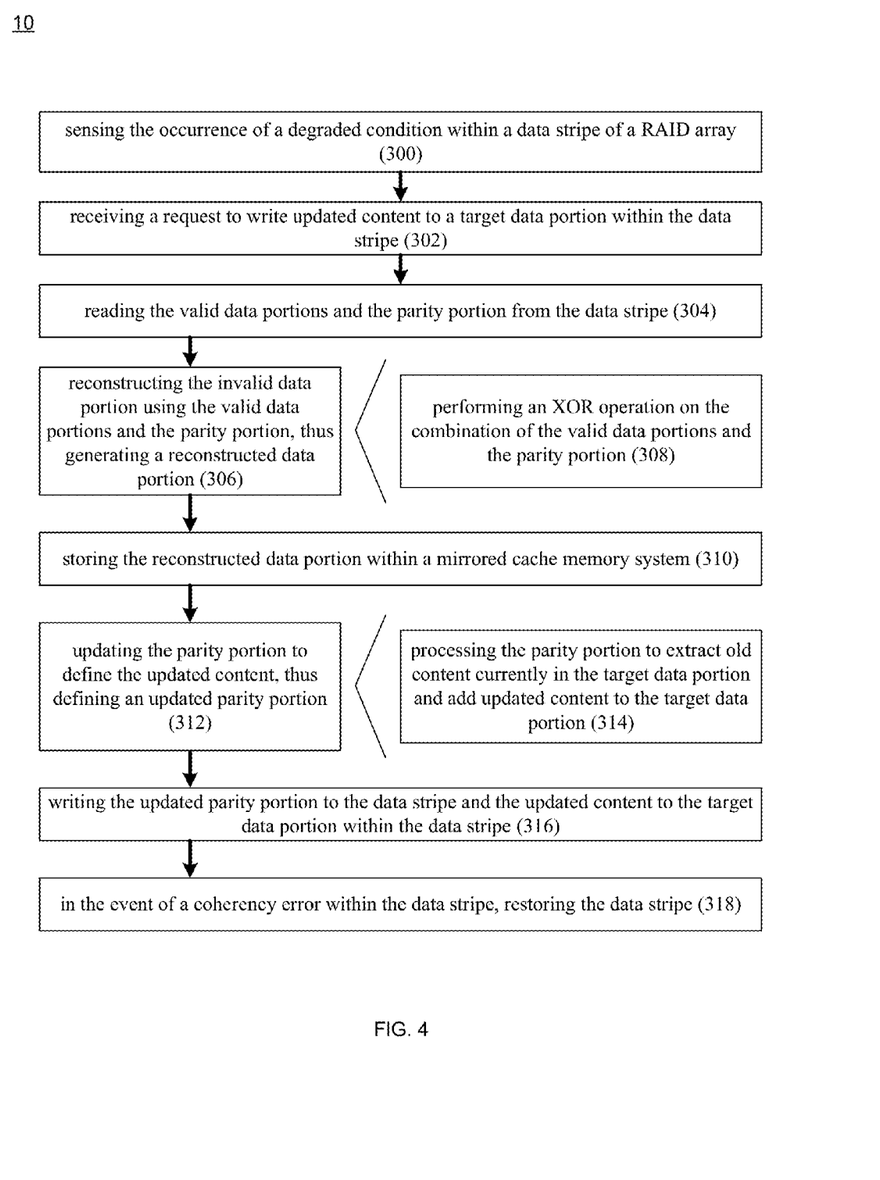
FIG. 4 is a flow chart of one implementation of the storage management process of FIG. 1.

Accordingly and referring also to FIG. 4, upon sensing 300 the occurrence of a degraded condition within a data stripe (e.g., data stripe 200), storage management process 10 may be configured to take various precautionary measures to prevent data stripe 200 from entering into an "uncorrectable condition" due to a coherency error. As discussed above, assume that data stripe 200 is currently operating in a "degraded condition", wherein data portion 208 is invalid (due to the failure of target 108) but data portions 202, 204, 206 and parity portion 210 are all valid.

Storage management process 10 may receive 302 a request to write updated content (e.g., content 118) to a target data portion (e.g., data portion 202) within data stripe 200 (which, as discussed above, is currently valid). Upon receiving this request, storage management process 10 may read 304 the valid data portions (e.g., data portions 202, 204, 206) and parity portion 210 from data stripe 200.

Storage management process 10 may reconstruct 306 the invalid data portion (e.g., data portion 208) using the valid data portions (e.g., data portions 202, 204, 206) and parity portion 210, thus generating reconstructed data portion 208'.

When reconstructing 306 the invalid data portion (e.g., data portion 208), storage management process 10 may perform 308 an XOR operation on the combination of the valid data portions (e.g., data portions 202, 204, 206) and parity portion 210. For example, reconstructed data portion 208' is equal to data portion 202 $\oplus$ data portion 204 $\oplus$ data portion 206 $\oplus$ parity portion 210.

Storage management process 10 may store 310 reconstructed data portion 208' within a mirrored cache memory system (e.g., mirrored cache system 122, FIG. 2) included within/accessible by storage processor 100. For example, storage processor 100 may be configured in an active/active relationship with other storage processors (e.g., storage processor 124), wherein each of storage processors 100, 124 has a local cache system (e.g., cache systems 126, 128 respectively) wherein cache entries that are written to either of these local cache systems are mirrored to the other local cache system. Accordingly, when storage management process 10 stores 310 reconstructed data portion 208' within mirrored cache memory system 122, a copy of reconstructed data portion 208' is stored locally within cache systems 126 resident on storage processor 100 and a copy of reconstructed data portion 208' is stored remotely within cache system 128 resident on storage processor 124. Accordingly, if storage processors 100, 124 are configured to be powered by different electrical circuits/supplies, the likelihood of reconstructed data portion 208' being lost due to a power failure is greatly reduced.

Storage management process 10 may also update 312 the parity portion (e.g., parity portion 210) to define the updated content (e.g., content 118 to be written to data portion 202), thus defining an updated parity portion (e.g., updated parity portion 210') having updated checksum 220'. When updating 312 parity portion 210 to define the updated content included within data portion 202, storage management process 10 may process 314 parity portion 210 to extract the old content that is currently in the target data portion (e.g., data portion 202) and add the updated content (e.g., content 118) to the target data portion (e.g., data portion 202). Storage management process 10 may perform this update 312 using an XOR operation as follows: a) read in the old data, b) XOR the old data into parity, c) XOR the new data into parity, and d) write out the new parity and new data. In the event that the data position to be written is failed, the data may be reconstructed by reading all positions. This reconstructed (old) data may then be XOR'd into parity to remove the (old) data from parity.

Once updated 312, storage management process 10 may write 316 updated parity portion 210' to data stripe 200 and the updated content (e.g., content 118) to the target data portion (e.g., data portion 202) within data stripe 200. Typically, storage management process 10 may perform the above-described operations in parallel, so that updated parity portion 210' is written 316 to data stripe 200 at the same time that the updated content (e.g., content 118) is written 316 to the target data portion (e.g., data portion 202) within data stripe 200.

In the event of a coherency error within data stripe 200 (wherein the parity is no longer valid for the reasons discussed above), storage management process 10 may restore 318 data stripe 200 using: the updated content (e.g., content 118) to be written to the target data portion (e.g., data portion 202) that currently resides in mirrored cache memory system 122; reconstructed data portion 208' that currently resides in mirrored cache memory system 122; and the one or more valid data portions that are not the target data portion (namely data portions 206, 208) that currently reside on data stripe 200.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    sensing an occurrence of a degraded condition within a data stripe of a RAID array, wherein the data strip includes one or more valid data portions, one invalid data portion, and a parity portion;
    receiving a request to write updated content to a target data portion within the data stripe, wherein the target data portion is one of the valid data portions;
    preventing the data stripe from entering an uncorrectable condition by reading the valid data portions and the parity portion from the data stripe upon sensing the occurrence of the degraded condition and receipt of request to write for one of the valid data portions;
    reconstructing the invalid data portion using the valid data portions and the parity portion by performing an XOR operation on the combination of the valid data portions and the parity portion, thus generating a reconstructed data portion;
    storing the reconstructed data portion within a mirrored cache memory system, wherein the mirrored cache memory system is powered by a different power supply from a local cache memory system and is configured to provide a backup in the event of an uncorrectable condition within the local cache memory system;
    updating the parity portion to define the updated content, thus defining an updated parity portion; and
    writing the updated parity portion to the data stripe and the updated content to the target data portion within the data stripe.

2. The computer-implemented method of claim 1 further comprising:
    in the event of a coherency error within the data stripe, restoring the data stripe using:
        the updated content to be written to the target data portion;
        the reconstructed data portion stored within the mirrored cache memory system; and
        the one or more valid data portions that are not the target data portion.

3. The computer-implemented method of claim 1 wherein the mirrored cache memory system is mirrored between a plurality of storage processors.

4. The computer-implemented method of claim 1 wherein updating the parity portion to define the updated content includes:
    processing the parity portion to extract old content currently in the target data portion and add updated content to the target data portion.

5. The computer-implemented method of claim 1 wherein the degraded condition is the result of one or more of: a drive failure and a media error.

6. The computer-implemented method of claim 1 wherein the RAID array is one of a RAID 3 array, RAID 5 array and a RAID 6 array.

7. A computer program product residing on a non-transitory computer readable medium having a plurality of instructions stored thereon which, when executed by a processor, cause the processor to perform operations comprising:
    sensing an occurrence of a degraded condition within a data stripe of a RAID array, wherein the data strip includes one or more valid data portions, one invalid data portion, and a parity portion;
    receiving a request to write updated content to a target data portion within the data stripe, wherein the target data portion is one of the valid data portions;
    preventing the data stripe from entering an uncorrectable condition by reading the valid data portions and the parity portion from the data stripe upon sensing the occurrence of the degraded condition and receipt of the request to write for one of the valid data portions;
    reconstructing the invalid data portion using the valid data portions and the parity portion by performing an XOR operation on the combination of the valid data portions and the parity portion, thus generating a reconstructed data portion;
    storing the reconstructed data portion within a mirrored cache memory system, wherein the mirrored cache memory system is powered by a different power supply from a local cache memory system and is configured to provide a backup in the event of an uncorrectable condition within the local cache memory system;
    updating the parity portion to define the updated content, thus defining an updated parity portion; and
    writing the updated parity portion to the data stripe and the updated content to the target data portion within the data stripe.

8. The computer program product of claim 7 further comprising instructions for performing operations including:
    in the event of a coherency error within the data stripe, restoring the data stripe using:
        the updated content to be written to the target data portion;
        the reconstructed data portion stored within the mirrored cache memory system; and
        the one or more valid data portions that are not the target data portion.

9. The computer program product of claim 7 wherein the mirrored cache memory system is mirrored between a plurality of storage processors.

10. The computer program product of claim 7 wherein updating the parity portion to define the updated content includes:
    processing the parity portion to extract old content currently in the target data portion and add updated content to the target data portion.

11. The computer program product of claim 7 wherein the degraded condition is the result of one or more of: a drive failure and a media error.

12. The computer program product of claim 7 wherein the RAID array is one of a RAID 3 array, RAID 5 array and a RAID 6 array.

13. A computing system including a processor and memory configured to perform operations comprising:
    sensing an occurrence of a degraded condition within a data stripe of a RAID array, wherein the data strip includes one or more valid data portions, one invalid data portion, and a parity portion;

receiving a request to write updated content to a target data portion within the data stripe, wherein the target data portion is one of the valid data portions;

preventing the data stripe from entering an uncorrectable condition by reading the valid data portions and the parity portion from the data stripe upon sensing the occurrence of the degraded condition and receipt of the request to write for one of the valid data portions;

reconstructing the invalid data portion using the valid data portions and the parity portion by performing an XOR operation on the combination of the valid data portions and the parity portion, thus generating a reconstructed data portion;

storing the reconstructed data portion within a mirrored cache memory system, wherein the mirrored cache memory system is powered by a different power supply from a local cache memory system and is configured to provide a backup in the event of an uncorrectable condition within the local cache memory system;

updating the parity portion to define the updated content, thus defining an updated parity portion; and writing the updated parity portion to the data stripe and the updated content to the target data portion within the data stripe.

14. The computing system of claim 13 further configured to perform operations comprising:
   in the event of a coherency error within the data stripe, restoring the data stripe using:
      the updated content to be written to the target data portion;
      the reconstructed data portion stored within the mirrored cache memory system; and
      the one or more valid data portions that are not the target data portion.

15. The computing system of claim 13 wherein the mirrored cache memory system is mirrored between a plurality of storage processors.

16. The computing system of claim 13 wherein updating the parity portion to define the updated content includes:
   processing the parity portion to extract old content currently in the target data portion and add updated content to the target data portion.

17. The computing system of claim 13 wherein the degraded condition is the result of one or more of: a drive failure and a media error.

* * * * *